US009261618B2

(12) United States Patent
Stenzel et al.

(10) Patent No.: US 9,261,618 B2
(45) Date of Patent: Feb. 16, 2016

(54) METHOD AND SYSTEM OF DEPTH TRIGGERS FOR MARINE GEOPHYSICAL SURVEY CABLE RETRIEVER SYSTEMS

(71) Applicant: PGS Geophysical AS, Oslo (NO)

(72) Inventors: Andre Stenzel, Sugar Land, TX (US); Youlin Hu, The Woodlands, TX (US)

(73) Assignee: PGS Geophysical AS, Oslo (NO)

( * ) Notice: Subject to any disclaimer, the term of this patent is extended or adjusted under 35 U.S.C. 154(b) by 0 days.

(21) Appl. No.: 14/513,723

(22) Filed: Oct. 14, 2014

(65) Prior Publication Data

US 2015/0030393 A1    Jan. 29, 2015

Related U.S. Application Data

(62) Division of application No. 13/193,787, filed on Jul. 29, 2011, now Pat. No. 8,926,222.

(51) Int. Cl.
| | |
|---|---|
| *F16L 1/24* | (2006.01) |
| *G01V 1/38* | (2006.01) |
| *B63B 22/14* | (2006.01) |
| *B63C 7/10* | (2006.01) |
| *H02G 1/10* | (2006.01) |
| *G01V 1/20* | (2006.01) |

(52) U.S. Cl.
CPC . *G01V 1/38* (2013.01); *B63B 22/14* (2013.01); *B63C 7/10* (2013.01); *G01V 1/3843* (2013.01); *G01V 1/201* (2013.01); *G01V 2001/207* (2013.01); *H02G 1/10* (2013.01)

(58) Field of Classification Search
CPC ...................................................... F16L 1/24
USPC ......... 405/171; 367/4, 20; 114/345, 242, 244, 114/245, 253; 441/2, 9, 10, 90–100, 133
See application file for complete search history.

(56) References Cited

U.S. PATENT DOCUMENTS

| | | |
|---|---|---|
| 2,811,208 A | 10/1957 | Eadie |
| 3,853,137 A | 12/1974 | Manson, Jr. et al. |
| 3,909,774 A | 9/1975 | Pavey, Jr. |
| 4,823,325 A | 4/1989 | Cole, Jr. |
| 4,928,262 A | 5/1990 | Neeley et al. |
| 5,076,468 A | 12/1991 | Mackal |
| 5,400,922 A | 3/1995 | Weinheimer et al. |
| 5,404,339 A | 4/1995 | Cole, Jr. |
| 5,509,576 A | 4/1996 | Weinheimer et al. |
| 6,019,652 A | 2/2000 | Nielsen et al. |
| 6,533,627 B1 | 3/2003 | Ambs |
| 6,612,886 B2 | 9/2003 | Cole, Jr. |
| 7,475,711 B2 | 1/2009 | Fawcett, Jr. et al. |
| 2011/0049449 A1 | 3/2011 | Scott |

OTHER PUBLICATIONS

Bal Seal Engineering, Inc. (n.d.). Retrieved from http:www.balseal.com/home (Jun. 6, 2011).

*Primary Examiner* — Sean Andrish (57) ABSTRACT

Depth triggers for marine geophysical survey cable retriever systems. At least some of the illustrative embodiments include causing a submerged geophysical survey cable to surface. In some cases, the causing the cable to surface may include: fracturing a frangible link wherein the frangible link, before the fracturing, affixes position of a piston within a cylinder bore of a housing coupled to the geophysical survey cable, and the fracturing of the frangible link responsive to pressure exerted on a face of the piston as the geophysical survey cable reaches or exceeds a predetermined depth; moving the piston within the cylinder bore; and deploying a mechanism that makes the geophysical survey cable more positively buoyant.

6 Claims, 8 Drawing Sheets

METHOD AND SYSTEM OF DEPTH TRIGGERS FOR MARINE GEOPHYSICAL SURVEY CABLE RETRIEVER SYSTEMS

CROSS-REFERENCE TO RELATED APPLICATIONS

This application is a Divisional of U.S. application Ser. No. 13/193,787 filed Jul. 29, 2011 and titled "Method and System of Depth Triggers for Marine Geophysical Survey Cable Retriever Systems" which is incorporated by reference herein as if reproduced in full below.

BACKGROUND

Marine survey systems are used to acquire data (e.g., seismic, electromagnetic) regarding earth formations below a body of water such as a lake or ocean. The marine survey systems typically use a plurality of sensor streamers which contain one or more sensors disposed within an outer jacket.

In some situations, one or more sensor streamers may be disconnected from the survey system, the disconnection possibly caused by failure of a coupling mechanism or in some situations the sensor streamer may be severed (e.g., by the propeller of a passing vessel). In some failure scenarios, particularly with sensor streamers filled with alcohol or oil, the sensor streamer becomes negatively buoyant, thus tending to sink. In order to avoid complete loss of the sensor streamer, an inflatable balloon system may trigger (i.e., a retriever system), which causes the sensor streamer to surface.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect or direct connection. Thus, if a first device couples to a second device, that connection may be through a direct connection or through an indirect connection via other devices and connections.

"Cable" shall mean a flexible, axial load carrying member that also comprises electrical conductors and/or optical conductors for carrying electrical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

"About" shall mean plus or minus fifteen percent (15%) of the recited value.

"Gas" in reference to a substance shall refer to the state of the substance at standard atmospheric pressure and temperature. The fact that a substance may be a liquid at certain pressures and/or temperatures shall not obviate the substance's status as a gas.

"Non-triggered" with respect to a depth trigger mechanism or components thereof shall mean that the depth trigger mechanism is armed and has yet to change operational state from the armed condition.

"Triggered" with respect to a depth trigger mechanism or components thereof shall mean that the depth trigger mechanism has changed operational state responsive to reaching or exceeding a predetermined depth.

DETAILED DESCRIPTION

The following discussion is directed to various embodiments of the invention. Although one or more of these embodiments may be preferred, the embodiments disclosed should not be interpreted, or otherwise used, as limiting the scope of the disclosure or the claims. In addition, one skilled in the art will understand that the following description has broad application, and the discussion of any embodiment is meant only to be exemplary of that embodiment, and not intended to intimate that the scope of the disclosure or the claims is limited to that embodiment.

Various embodiments are directed to retriever systems for geophysical survey cables used in marine surveys. More particularly, at least some embodiments are directed to depth trigger mechanisms for retriever systems including lifting bag systems, ballast weight systems, or both. The ballast weight system enables the user to compensate the cable for buoyancy changes caused by, for example, differences in salinity and temperature of the water within which the marine survey will be performed. However, the ballast weight system may also selectively shed or jettison the ballast weights when the survey cable reaches a predetermined depth indicative of potential loss. The ballast weight system may work in conjunction with a selectively deployable lifting bag system. The specification first turns to an illustrative marine survey system to orient the reader, and then to example embodiments.

Figure 1:
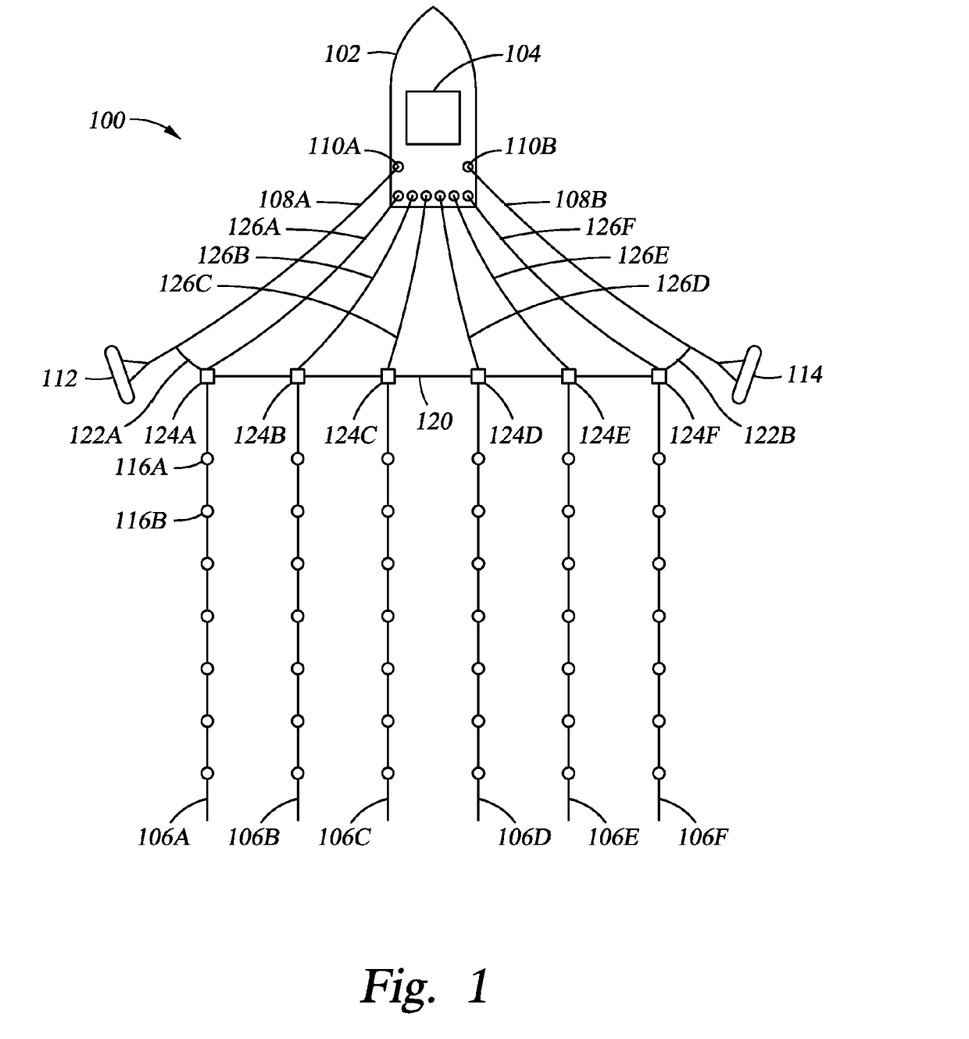
FIG. 1 shows an overhead view of marine survey system in accordance with at least some embodiments.

FIG. 1 shows an overhead view of a marine survey system 100 in accordance with at least some embodiments. In particular, FIG. 1 shows a survey vessel 102 having onboard equipment 104, such as navigation, energy source control, and data recording equipment. Survey vessel 102 is configured to tow one or more streamers 106A-F through the water. While FIG. 1 illustratively shows six streamers 106, any number of streamers 106 may be used. The discussion continues with respect to streamers 106 being sensor streamers, but streamers 106 are illustrative of any towed geophysical survey cable, such as transmitter cables and source cables.

The sensor streamers 106 are coupled to towing equipment that maintains the streamers 106 at selected depth and lateral positions with respect to each other and with respect to the survey vessel 102. The towing equipment may comprise two paravane tow lines 108A and 108B each coupled to the vessel 102 by way of winches 110A and 110B, respectively. The winches enable changing the deployed length of each paravane tow line 108A and 108B. The second end of paravane tow line 108A is coupled to a paravane 112, and the second end of paravane tow line 108B is coupled to paravane 114. In each case, the tow lines 108A and 108B couple to their respective paravanes through respective sets of lines called a "bridle". The paravanes 112 and 114 are each configured to provide a lateral force component to the various elements of the survey system when the paravanes are towed in the water. The combined lateral forces of the paravanes 112 and 114 separate the paravanes from each other until the paravanes put one or more spreader lines 120, coupled between the paravanes 112 and 114, into tension. The paravanes 112 and 114 either couple directly to the spreader line 120, or as illustrated couple to the spreader line by way of spur lines 122A and 122B.

The sensor streamers 106 are each coupled, at the ends nearest the vessel 102 (i.e., the proximal ends) to a respective lead-in cable termination 124A-F. The lead-in cable terminations 124A-F are coupled to or are associated with the spreader lines 120 so as to control the lateral positions of the streamers 106 with respect to each other and with respect to the vessel 102. Electrical and/or optical connections between the appropriate components in the onboard equipment 104, such as the recording system and the sensors (e.g., 116A, 116B) in the streamers 106 may be made using inner lead-in cables 126A-F. Much like the tow lines 108A and 108B associated with respective winches 110A and B, each of the lead-in cables 126A-F may be deployed by a respective winch or similar spooling device such that the deployed length of each lead-in cable 126A-F can be changed.

Figure 2:
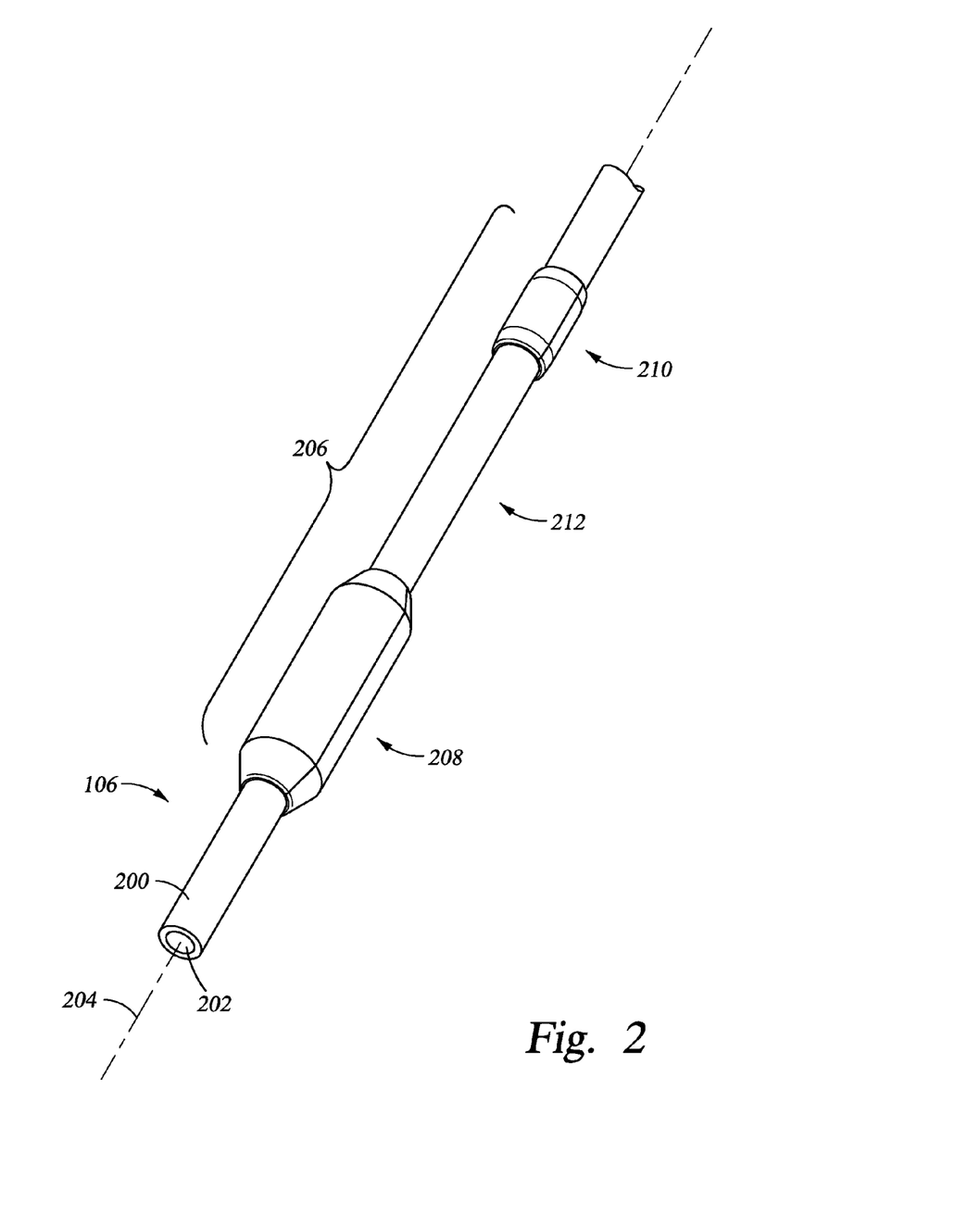
FIG. 2 shows a perspective view of a retriever system in accordance with at least some embodiments.

FIG. 2 shows a perspective view of a retriever system in accordance with at least some embodiments. In particular, FIG. 2 shows a portion of a sensor streamer 106. The sensor streamer 106 has an elongated outer jacket 200 that defines an interior volume 202. The elongated outer jacket defines a central axis 204. Though not specifically shown in FIG. 2, various sensors (e.g., hydrophones, geophones, electromagnetic sensors) associated with the sensor streamer 106 reside within interior volume 202 and are spaced longitudinally along the sensor streamer 106.

FIG. 2 further shows a retriever system 206 in accordance with at least some embodiments. In particular, retriever system 206 comprises a lifting bag system 208, and in some embodiments a ballast weight system 210. While FIG. 2 only shows one retriever system 206, it will be understood that a sensor streamer may have a length on the order of less than 200 meters to in excess of 15000 meters, and a plurality of such retriever systems 206 may be spaced along and thus associated with each sensor streamer 106. As illustrated, a portion 212 of the elongated outer jacket 200 may reside between the lifting bag system 208 and ballast weight system 210, and the portion 212 may comprise one or more sensors. In some cases, the retriever systems associated with a sensor streamer may be evenly spaced along the elongated outer jacket, and further the individual lifting bag systems and ballast weight systems evenly spaced, but such even spacing is not strictly required. The specification first turns to the lifting bag system 208 in accordance with various embodiments, and then turns to the ballast weight system 210.

Figure 3:
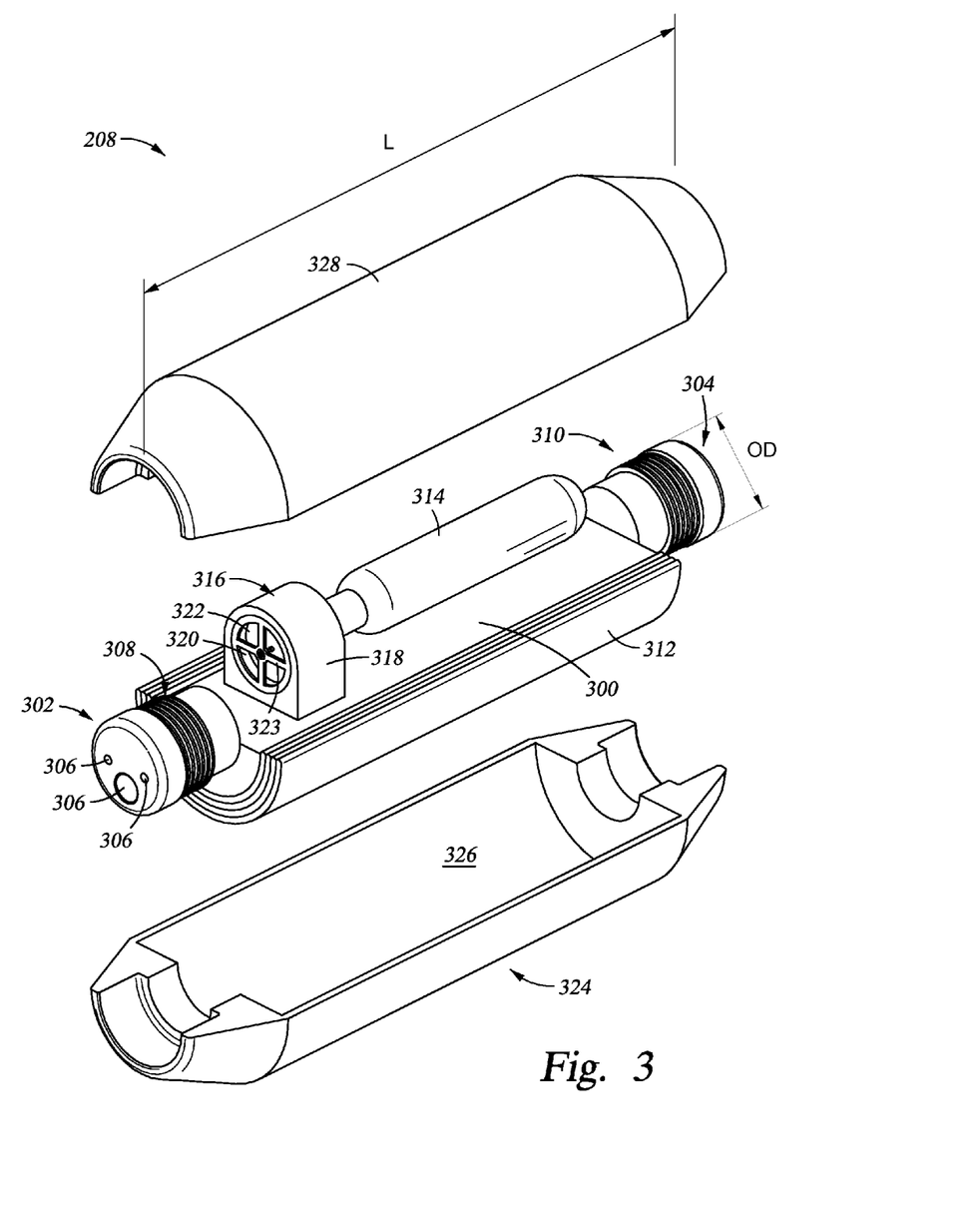
FIG. 3 shows an exploded perspective view of a lifting bag system in accordance with at least some embodiments.

FIG. 3 shows an exploded perspective view of a lifting bag system 208 (in a non-deployed condition) in accordance with at least some embodiments. In particular, the illustrative lifting bag system 208 comprises a bag attachment block 300 that defines a first end 302 and opposite second end 304, both of circular cross-sections. The bag attachment block defines a plurality of passages 306 that extend between the first end 302 and the second end 304 of the bag attachment block. It is through the passages 306 that various electrical, load carrying members, and/or communicative conductors of the sensor streamer 106 pass, such that power may be provided to the sensors and/or readings taken from the sensors. The first end 302 and second end 304 define an outside diameter (OD) sized to couple to an inside diameter of the elongated outer jacket 200 of the sensor streamer 106. In some cases, the first end 302 and second end 304 may comprise a plurality of grooves 308 and 310, respectively, to assist in the coupling of the ends 302 and 304 to the elongated outer jacket 200. The grooves may take any suitable form, such as rectangular grooves, triangular grooves, or grooves similar to threads, just to name a few. The bag attachment block 300 (including the ends 302 and 304) may be made from any suitable material keeping in mind that the buoyancy of the sensor streamer (with the lifting bag system 208 in a non-deployed state) is designed to be approximately neutrally buoyant. Thus, the bag attachment block 300 may be made from materials such as high density plastic, or light metals such as titanium or aluminum. Other materials, and combinations of materials, may be also be used.

The lifting bag system 208 further comprises a bag 312. FIG. 3 shows the lifting bag system 208 with the bag in a deflated and stowed state. When deflated and stowed the bag 312 is folded such the amount of space used to store the bag within the lifting bag system 308 is reduced. The bag 312 in its inflated state may take any suitable shape, such as round or rectangular. When deployed, the bag itself may mechanically couple to the bag attachment block 300 and support the weight of the sensor streamer. In other cases, the bag may be held within a net or lattice of ropes mechanically coupled to the bag attachment block 300. The material from which the bag 312 is constructed may take any suitable form. In some cases, the bag 312 material may be a plastic material, plastic coated fabric, or water tight or water resistant material.

In order to inflate the bag 312 when needed, the lifting bag system 208 further comprises gas cylinder 314 coupled to the bag attachment block 300. The gas cylinder 314 comprises a compressed gas that, when selectively released by depth trigger mechanism 316, inflates the bag 312. The compressed gas within the cylinder 314 may take any suitable form, such as compressed air, compressed nitrogen, compressed carbon dioxide, or other gas. In at least some embodiments, the compressed gas is held at a pressure and temperature where the gas becomes a liquid. More particularly, in some embodiments the compressed gas in the cylinder 314 is liquid carbon dioxide.

The lifting bag system 208 further comprises a depth trigger mechanism 316. When the depth of the lifting bag system 208 meets or exceeds a predetermined depth, the depth trigger mechanism 316 fluidly couples the compressed gas from the gas cylinder 314 to the internal volume of the bag 312 such that the bag 312 inflates. Illustrative depth trigger mechanism 316 defines an outer housing 318 into which a cylinder bore 320 is created. Within the cylinder bore 320 resides a piston 322 which is exposed to the ambient pressure of the water. The piston 322 is only partially visible in FIG. 3, the partial visibility caused by the cover plate 323, which cover plate is discussed more below. It is noted that being exposed to the ambient pressure does not necessarily mean the piston 322 is itself exposed to the water. Mechanisms for exposing the piston 322 to the ambient pressure without directly exposing the piston to the sea water are discussed more below. Generically stated, the trigger mechanism 316 is a mechanical system where increasing depth (i.e., increasing ambient pressure) moves the piston 322, which movement punctures a seal of the gas cylinder 314, which couples the compressed gas to the bag 312.

Still referring to FIG. 3, the lifting bag system 208 further comprises outer cover 324. In some embodiments, the outer cover 324 is a single frangible unit designed and constructed to break away as the bag 312 begins to inflate. Illustrative outer cover 324 is shown as comprising two halves 326 and 328. The covers 326 and 328 may couple to each other and/or a portion of the bag attachment block 300 as appropriate. In a particular embodiment, the outer covers 326 and 328 are designed and constructed to separate from each other as the bag 312 begins to inflate. In another embodiment, the outer covers 326 and 328 are assembled to form the overall outer cover 324 but may be frangible, breaking into smaller pieces as the bag 312 begins to inflate. The outer cover may be made of any suitable material, such as a plastic material.

Figure 4:
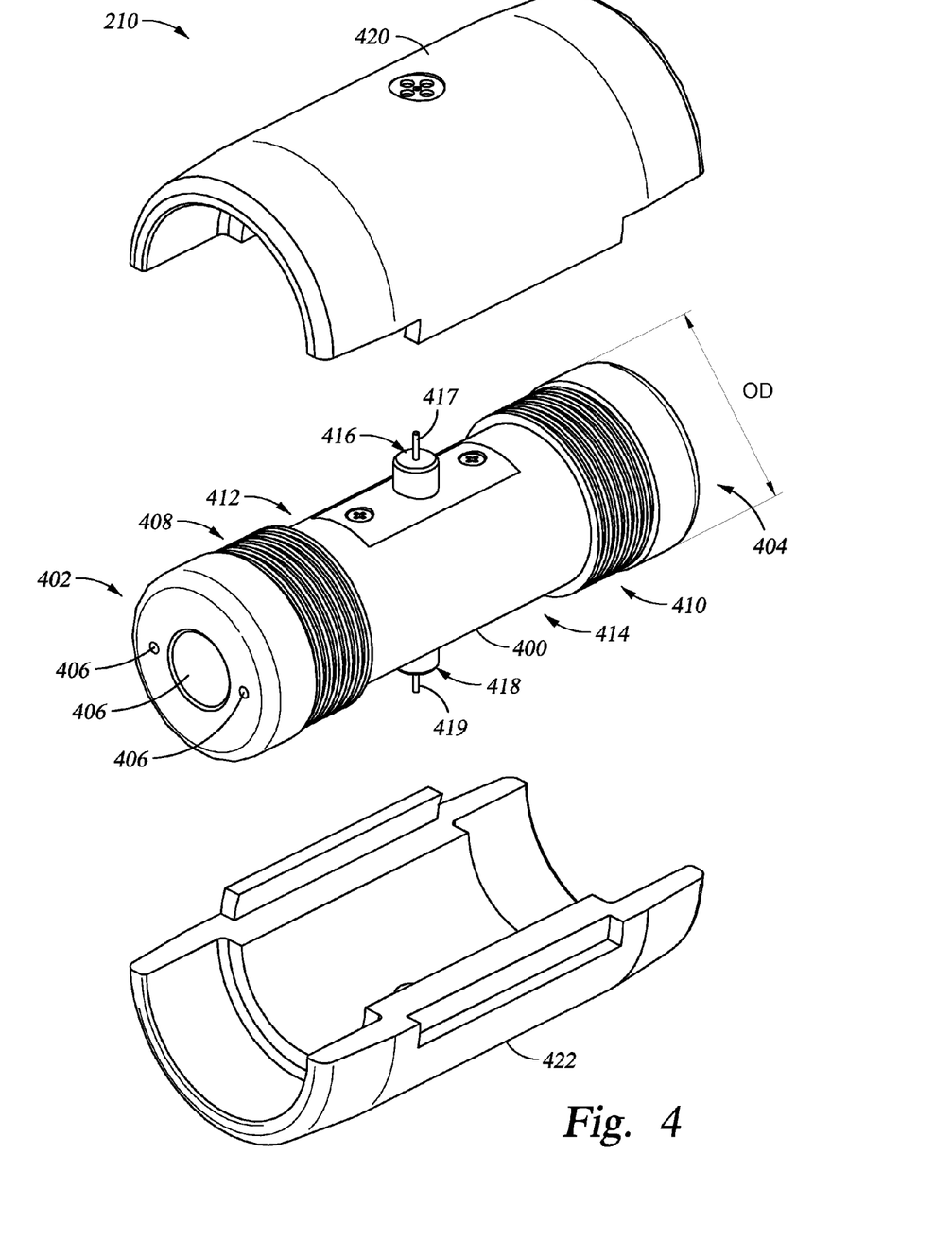
FIG. 4 shows an exploded perspective view of ballast system in accordance with at least some embodiments.

The retriever system 206 in accordance with at least some embodiments further comprises a ballast system 210. FIG. 4 shows an exploded, perspective view of a ballast system 210 in accordance with at least some embodiments. In particular, the illustrative ballast system 210 comprises a ballast attachment block 400 that defines a first end 402 and opposite second end 404, both of circular cross-section. The ballast attachment block defines a plurality of passages 406 that extend between the first end 402 and the second end 404. It is through the passages 406 that various electrical and/or communicative conductors of the sensor streamer 106 pass. The first end 402 and second end 404 define an outside diameter (OD) sized to couple to an inside diameter of the elongated outer jacket 200 of the sensor streamer 106. In some cases, the first end 402 and second end 404 may comprise a plurality of grooves 408 and 410, respectively, to assist in the coupling of the ends 402 and 404 to the elongated outer jacket 200. The grooves may take any suitable form, such as rectangular grooves, triangular grooves, or grooves similar to threads, just to name a few. The ballast attachment block 400 (including the ends 402 and 404) may be made from any suitable material keeping in mind that the buoyancy of the sensor streamer is designed to be approximately neutrally buoyant. Thus, the ballast attachment block 400 may be made from materials such as high density plastic, or light metals such as titanium or aluminum. Other materials, and combinations of materials, may be also be used.

Illustrative ballast attachment block 400 defines a first attachment location 412 and a second attachment location 414. In the illustrative embodiments of FIG. 4, the attachment locations are not necessarily structurally defined, except in relation to the depth trigger mechanisms 416 and 418, respectively (only the piston portion of depth trigger mechanisms 416 and 418 visible in FIG. 4). In other cases, the attachment locations 412 and 414 may be structurally delineated, such as by grooves, indentions, and/or areas of reduced diameter of the ballast attachment block 400. Also visible in FIG. 4 are the link members 417 and 419 associated with the depth trigger mechanism 416 and 418, respectively. The link members will be discussed more below.

The ballast system 210 further comprises a first ballast weight 420 and a second ballast weight 422. It is noted that while FIG. 4 shows the first ballast weight 420 in the upper orientation, and second ballast weight 422 in the lower configuration, though any rotational orientation of the weights is possible. Although FIG. 4 is an exploded view, in an operational configuration the first ballast weight 420 abuts the ballast attachment block 400 at the first attachment location 412, and if used the second ballast weight 422 abuts the ballast attachment block 400 at the second attachment location 414. In the illustrative embodiments of FIG. 4, the ballast weights 420 and 422 mechanically couple to the ballast attachment block 400 by way of their depth trigger mechanisms 416 and 418, respectively. Example depth trigger mechanisms are discussed move below.

The ballast weights may be constructed of any suitable substance. For example, in some cases the ballast weights are lead or bronze. In at least some embodiments, each ballast weight 420, 422 weighs approximately 1 kilogram. Thus, if both ballast weights are attached to the ballast attachment block 400, the ballast system 210 may add approximately 2 kilograms to the overall weight of the attached sensor streamer. The ballast weights are added to ballast attachment blocks along the length of a sensor streamer to adjust the buoyancy of the sensor streamer. That is, the sensor streamer may be designed and constructed to be substantially neutrally buoyant in water of a particular salinity and temperature. However, marine surveys may be taken in a variety of locations and a variety of local conditions, and thus the ballast weights may be added and/or removed at the surface to compensate for the specific salinity and temperature of water expected. In cases where only one ballast weight is used at a particular ballast attachment block, a dummy cover, weighing substantially less than a ballast weight, may be placed at the unused attachment location.

Figure 5:
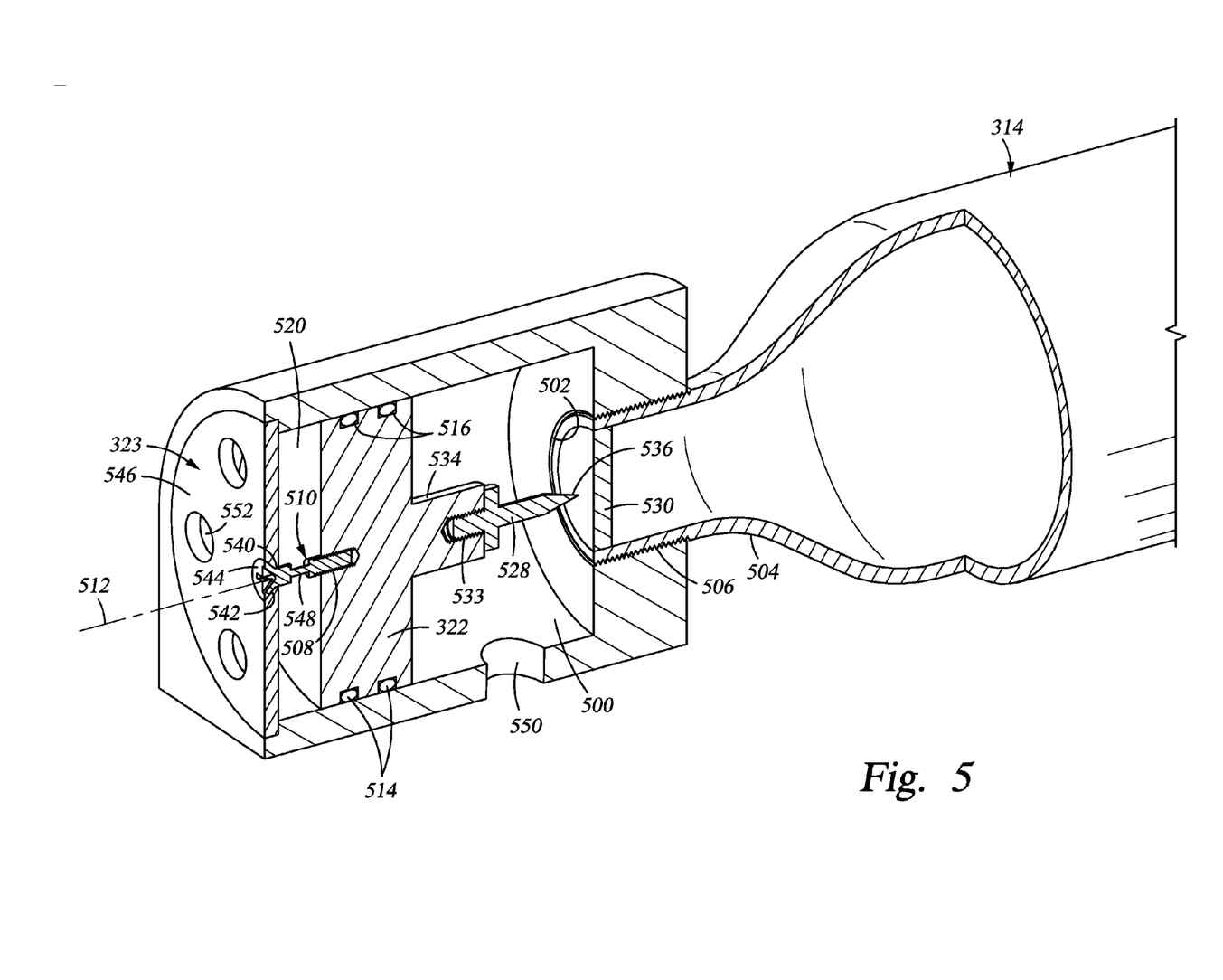
FIG. 5 shows a perspective cross-sectional view of a depth trigger mechanism for a lifting bag system in accordance with at least some embodiments.

The specification now turns to various embodiments of the depth trigger mechanisms, starting with the depth trigger mechanism for the lifting bag system 208. FIG. 5 shows a cross-sectional perspective view of a depth trigger mechanism 316 coupled to a gas cylinder 314 in accordance with at least some embodiments. In particular, the depth trigger mechanism 316 comprises outer housing 318. The outer housing may be made of any suitable material, but copper-based alloys (e.g., brass, beryllium copper) offer better resistance to fouling by sea creatures, such as barnacles. A counter-bore within the outer housing 318 defines a cylinder bore 500 within which the piston 322 is located. For a depth trigger mechanism 316 designed to trigger at about 55 meters of depth and below, the cylinder bore 500 has an inside diameter of about 2.5 centimeters (cm), but larger or smaller inside diameters may be used.

The outer housing 318 further defines another counter bore 502 within which the neck 504 of the gas cylinder 314 may be inserted and coupled. In some cases, the inside diameter of the counter bore 502 may be threaded, and likewise the outside diameter of the neck 504 of the gas cylinder may be threaded, and thus the gas cylinder 314 couples to the outer housing 318 by way of a threaded connection 506. Other mechanisms to couple the gas cylinder 314 to the outer housing 318 may be used.

Still referring to FIG. 5, the piston 322 in accordance with the illustrated embodiments comprises a counter bore 508 within which a frangible link or link member 510 is coupled. As illustrated, the counter bore 508 is internally threaded, and a portion of the link member 510 is externally threaded, such that the link member threadingly couples to the piston 322. Other connection systems may be used. As illustrated, the counter bore 508 is centered in the piston 322. That is, the counter bore 508 defines a central axis that is coaxial with the piston central axis 512. Likewise, the link member 510 defines a central axis which is coaxial with the piston central axis 512. Other alignments are possible. As will be discussed more below, the link member 510 holds the piston 322 in a non-triggered state until depth of the depth trigger mechanism reaches or exceeds a predetermined depth.

An outside diameter of the piston 322 seals against the inside diameter of the cylinder bore 500 by way of o-rings 514 within respective annular grooves 516. While FIG. 5 shows two annular grooves 516 and two o-rings 514, one or more o-ring and annular groove systems may be used. While the o-rings 514 seal against the inside diameter of the cylinder bore 500, the o-rings nevertheless enable movement of the piston 322 within the cylinder bore 500. That is, after the link member 510 has fractured, the ambient pressure against the outer face 520 of the piston 322 pushes the piston 322 inwardly into the cylinder bore 500. Likewise, when the depth trigger mechanism is triggered at depth, the pressure released within the cylinder bore 500 may tend to push the piston 322 outwardly.

The depth trigger mechanism 316 illustrated in FIG. 5 further comprises lance member 528 coupled to the piston 322 and disposed within the outer housing 318. As the name implies, the lance member 528 is used to lance or puncture the seal 530 of the gas cylinder 314 when the depth trigger mechanism 316 reaches or exceeds the predetermined depth. While in some cases at least the outer face 520 and outside diameter of the piston 322 are made of copper-based alloys to reduce fouling by sea creatures, the lance member 528 is made of hardened steel. As illustrated, the lance member 528 couples to the piston 322 by way of a counter bore 533 in a rod member 534. In some cases the counter bore 533 is internally threaded, and the lance member 528 is externally threaded, and thus the lance member 528 couples by way of a threaded connection. Other connection mechanisms are possible. The lance member 528 defines a sharpened point 536, which in the illustrative case of FIG. 5 is in the form of a spear. The lance member 528 may also be shaped in other forms to shear, puncture, and/or pierce open the seal of the cylinder containing compressed gas.

The depth trigger mechanism 316 of FIG. 5 is shown in the non-triggered state (i.e., the lance member 528 has not punctured the seal 530). The piston 322 and lance member 528 are held in the non-triggered state by link member 510. In particular, link member is coupled on one end to the piston 322 (illustratively by way of the threads in counter bore 508). On the second end, link member 510 couples to the cover plate 323. As illustrated, the cover plate 323 comprises an aperture 540 through which the link member 510 is telescoped. The illustrated aperture 540 defines a shoulder region 542 against which a head portion 544 of the link member 510 abuts after insertion. In other cases, the head portion 544 may abut the outer face 546 of the cover plate 323. At depths above (i.e., more shallow) than the predetermined depth, the link member 510 holds the piston 322 in the non-triggered state.

As the illustrative depth trigger mechanism 316 gets progressively deeper in water, the water pressure on the outer face 520 of the piston 322 increases, while the pressure within the cylinder bore 500 behind the piston stays relatively constant. The differential pressure experienced by the piston 322 creates a tension force on the link member 510. However, at depths above the predetermined depth the link member has sufficient mechanical strength to hold the piston 322 in the non-triggered state. It is to be understood that the non-triggered state is not characterized by a complete lack of movement of the piston 322 into the cylinder bore 500. Though link member 510 in some embodiments is metallic and rigid, some plastic deformation is possible. Thus, the non-triggered state is characterized by the lance member 528 having yet to puncture the seal 530.

At the predetermined depth or below, the pressure exerted on the outer face 520 of the piston 322 creates a tension force that overcomes the mechanical strength of the link member 510. In the embodiments illustrated by FIG. 5, link member 510 is circular and has a reduced diameter portion 548. At the predetermined depth and below, the tension force created by the ambient pressure acting on the piston face 520 and applied to the link member 510 fractures link member 510. In some embodiments, the link member 510 may be made of brass, and the reduced diameter portion 548 has an outside diameter of about 0.2 cm. With a piston 322 outside diameter of about 2.5 cm, the result is a fracture depth for the link member of about 60 meters.

Other types of materials may be used for the link member 510. Copper-based alloys provide resistance to fouling from sea creatures, but in other embodiments any suitable material for the link member 510 may be used. For example, in situations where the link member is not exposed to the sea water (discussed below) non-copper-based alloys may be used, such as stainless steel. In yet still other cases, non-metallic materials may be used, such as plastics. The outside diameter will be adjusted according to the strength of the material from which the link member 510 is constructed and the trigger depth. The fracture mode, likewise, may be of any suitable type for the material used. For example, the fracture mode may be a ductile fracture involving some plastic deformation prior to fracture, or a ductile fracture with little or no plastic deformation prior to fracture. It is further noted that the link member 510 need not define the reduced diameter portion 548, in some cases the entire link member 510 may have the outside diameter calibrated to fracture at the predetermined depth. Moreover, while link member 510 is described in terms of a member of circular cross-section (at least at portion 548), other cross-sectional shapes may be used.

When the fracture of the link member occurs, the depth trigger mechanism 316 is placed in a triggered state where the piston 322 extends into the cylinder bore 500 a sufficient distance for the lance member 528 to puncture the seal 530. Once the seal is punctured, the gas in the gas cylinder 314 is released and flows into the cylinder bore 500 and into the air bag 312 (FIG. 3) by way of aperture 550.

While FIG. 5 shows only a single link member 510, multiple such members may be used. For example, in situations wherein triggering occurs at deeper depths or in situations where the piston 322 has a larger outside diameter, multiple link members may be used. In the illustrative embodiments of FIG. 5, the tension force created by piston 322; however, the force applied to the link member 510 may cause a fracture by any suitable physical process. For example, the link member may be arranged such that the tension force applied to the link member may apply a shearing force to a portion of the link member 510, or the tension force applied to the link member may apply a compression force to a portion of the link member 510.

Cover plate 323 couples to the outer housing 318 and partially occludes the aperture for the cylinder bore 500. In order to communicate the ambient pressure to the outer face 520 of the piston 322, the illustrative cover plate 323 comprises at least one aperture 552. The cover plate 323 may be made of any suitable material with sufficient strength to hold the tension force placed on the link member 510. In some cases, the cover plate 323 is constructed of a copper-based alloy (e.g., brass, beryllium copper) to reduce fouling by sea creatures, such as barnacles.

The various embodiments discussed to this point have been with respect to the depth trigger mechanism used in connection with the lifting bag system 208, puncturing a seal of the gas cylinder when the system reaches or exceeds the predetermined depth. However, the same principles of operation may be used with respect to the ballast weight system 210, though no lancing operation is needed with respect to the ballast weights.

Figure 6:
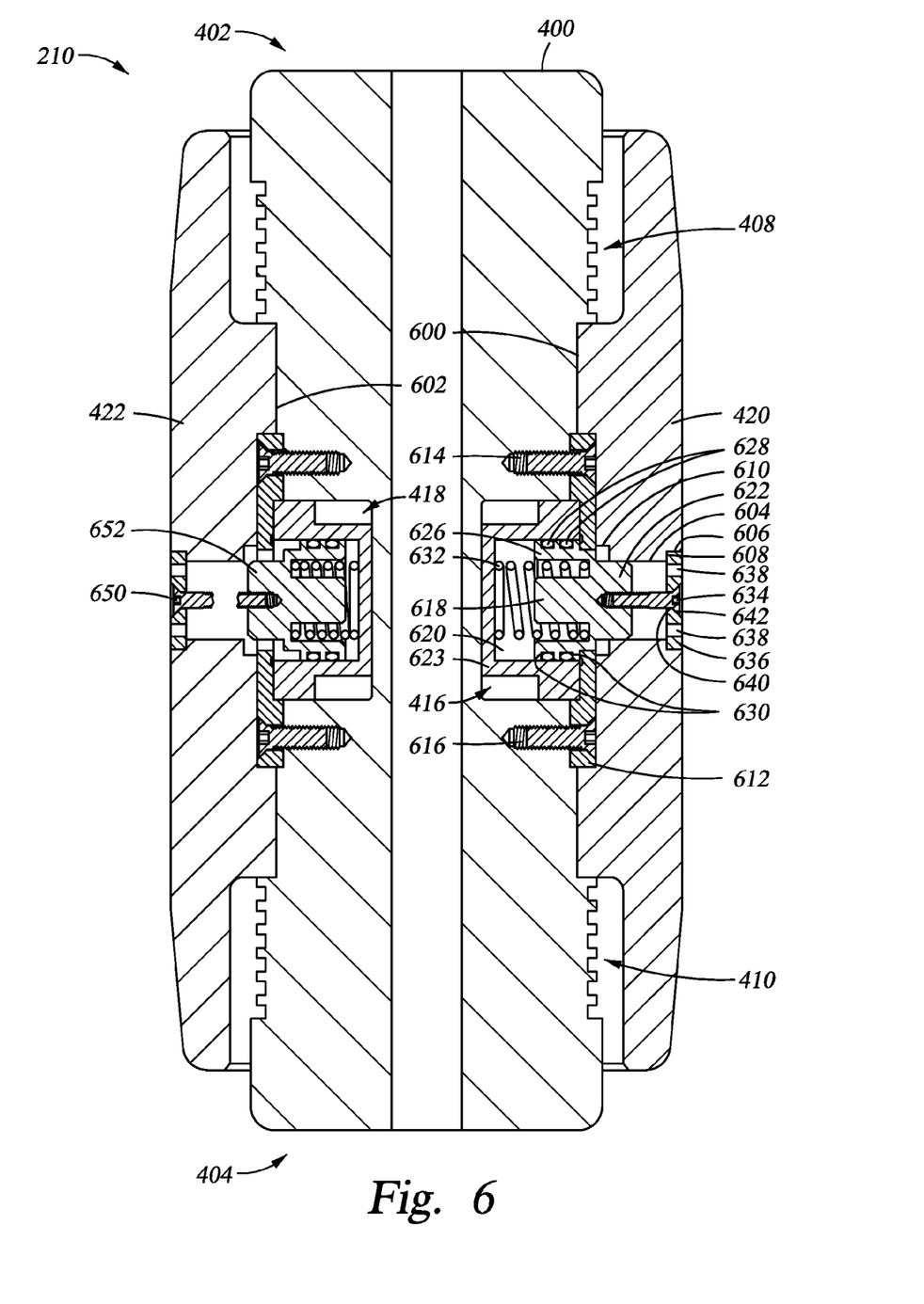
FIG. 6 shows a cross-sectional elevation view of a ballast system in accordance with at least some embodiments.

FIG. 6 shows a cross-sectional elevation view of a ballast system 210 in accordance with at least some embodiments. In particular, FIG. 6 shows the ballast attachment block 400 having the first ballast weight 420 and second ballast weight 422 in an abutting relationship with the ballast attachment block 400. The illustrated ballast attachment block 400 differs from that illustrated in FIG. 4 in that the attachment locations are more delineated, the delineation in the form of reduced outside diameter portions 600 and 602. Moreover, FIG. 6 illustrates that the grooves 408 and 410 may likewise define a smaller outside diameter than more distal portions of the first end 402 and second end 404, respectively. For example, the elongated outer jacket may telescope over and end 402 or 404, and then be held in place by a mechanical member, such as a band that circumscribes the elongated outer jacket at the location of the grooves.

Referring to ballast weight 420 as representative, ballast weight 420 comprises a through bore 604, as well as an outside counter bore 606 of larger diameter such that a shoulder region 608 is defined. The ballast weight 420 further comprises another counter bore 610 on an opposite side of the through bore 604 from the counter bore 606. Illustrative depth release mechanism 416 of FIG. 6 comprises retention plate 612, which may be attached to the ballast attachment block by way of fasteners within threaded apertures 614 and 616. While FIG. 6 illustrates the use of threaded fasteners, any suitable attachment system may be used. The retention plate retains the piston member 618 at least partially within a chamber 620. As illustrated, the chamber 620 is defined within a chamber block member 623, but in other cases the chamber 620 may be defined directly by a counter bore in the ballast attachment block 400. The piston member 618 defines a retention portion 622 that, in the illustrated non-triggered state, protrudes into the through bore 604.

Still referring to FIG. 6, the piston member further comprises chamber portion 626 that resides within the chamber 620. As illustrated, the chamber portion 626 seals against the inside diameter of the chamber 620, for example, by way of o-rings 628 in respective grooves 630. Other sealing mechanisms may be used. Also within the chamber 620 is spring member in the form of a coil spring 632. The pressure of the gas (e.g., air) within the chamber, as well as the force created by compression of the illustrative coil spring 632, tend to bias the piston member into an extended orientation, as shown by depth release mechanism 416.

The ballast weight 420 couples to the ballast attachment block, at least in part, by way of frangible link or link member 634 and outer plate 636. In particular, the outer plate 636 couples within the counter bore 606 and abuts the shoulder region 608. The outer plate 636 defines apertures 638 such that the ambient pressure of the water can be conveyed to the piston 618. The outer plate 636 further comprises a through bore 640 within which a counter bore 642 is created. The counter bore 642 creates a shoulder region against which a head of the link member 634 abuts. The opposite end of the link member couples to the retention portion 622 of the piston 618 in a similar manner as discussed above with the respect to the depth trigger mechanism 316, and will not be numbered in FIG. 6 so as not to unduly complicate the figure. The link member 634 in combination with the outer plate 636 hold the ballast weight 420 when the in the abutting relationship in operation (e.g., use during a marine survey). Moreover, in embodiments where the retention portion 622 extends into the through bore 604, interaction between the inside diameter of the through bore 604 and the retention portion may provide stability against movement of the ballast weight 420 along the long axis of the ballast attachment block 400.

In the non-triggered state, the piston member 618 will tend be in its most extended orientation. As the ballast system 210 increases in depth, increased pressure (communicated at least in part through the apertures 638 in the outer plate 636) creates a force tending to retract the piston member 618 into the chamber 620. Both the gas within the chamber 620 and the spring 618 tend to resist movement. Moreover, the link member 634 holds the piston 618 in the non-triggered state. It is noted that some plastic deformation of the link member 634 is possible, and thus the non-triggered state is not characterized as a complete lack of movement of the piston.

However, when the ballast system 210 reaches or exceeds the predetermined depth, the force applied to the piston member 618 overcomes the various forces resisting movement of the piston member 618. In a particular embodiment, the tension force applied to the link member 634 fractures the link member 634. Once the link member is fractured, the ambient pressure forces the piston 618 into a retracted orientation. In some cases, the retracted orientation withdraws the retention portion 622 out of the through bore 604. Once the link member 634 is fractured, the ballast weight 420 is effectively released, and can fall away.

While the depth release mechanism 416 is shown in the non-triggered state, depth release mechanism 418 is shown in the triggered state. That is, the link member 650 has been fractured, and the piston member 652 of depth release mechanism 418 is shown in a fully retracted orientation. In some embodiments, the depth trigger mechanisms of the ballast weight system 210 trigger at the predetermined depth being about 55 meters, but the depth trigger mechanisms of the ballast weight system 210 may trigger at depths above or below the lifting bag systems 208. In a particular embodiment, each piston of the depth release mechanisms has an outside diameter of about 2.5 cm, and the each link member has at least a portion with an outside diameter of about 0.2 cm, but other sizes may be used. Moreover, in some cases the springs that biases the pistons outward may be omitted.

Figure 7:
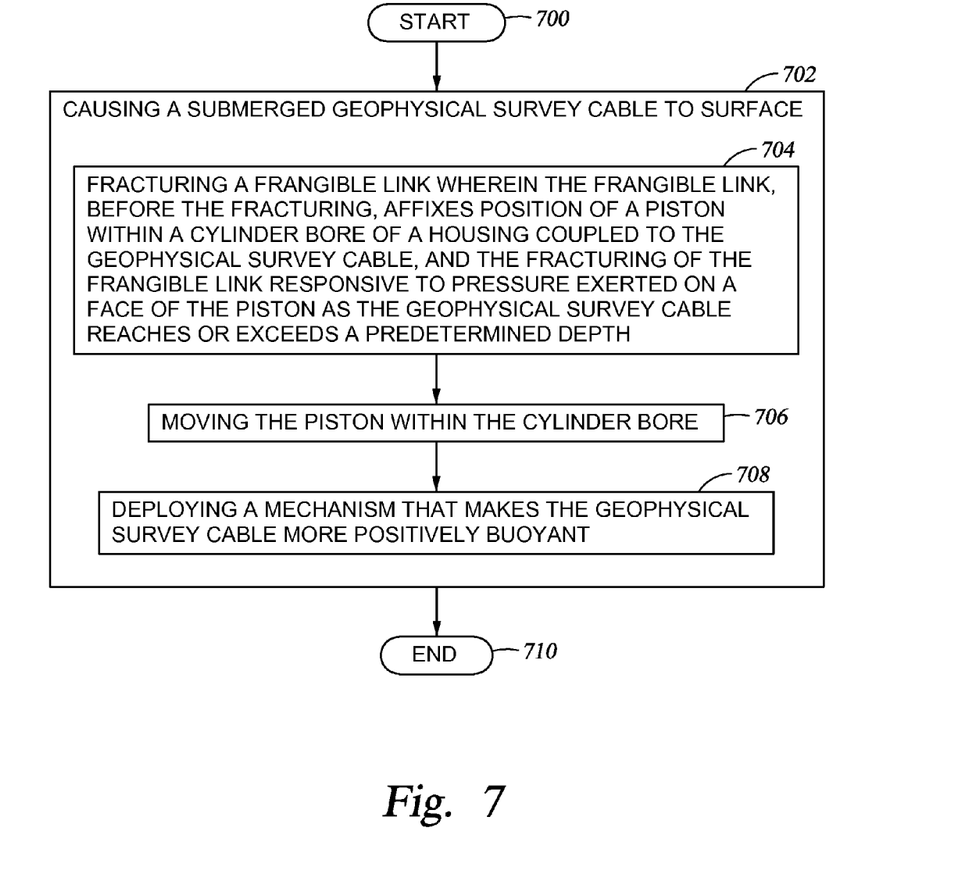
FIG. 7 shows a method in accordance with at least some embodiments.

FIG. 7 shows a method in accordance with at least some embodiments. In particular, the method starts (block 700) and comprises causing a submerged geophysical survey cable to surface (block 702). Causing the survey cable to surface may comprise: fracturing a frangible link wherein the frangible link, before the fracturing, affixes position of a piston within a cylinder bore of a housing coupled to the geophysical survey cable, and the fracturing of the frangible link responsive to pressure exerted on a face of the piston as the geophysical survey cable reaches or exceeds a predetermined depth (block 704); moving the piston within the cylinder bore (block 706); and deploying a mechanism that makes the geophysical survey cable more positively buoyant (block 708). Thereafter, the method ends (block 710).

Figure 8:
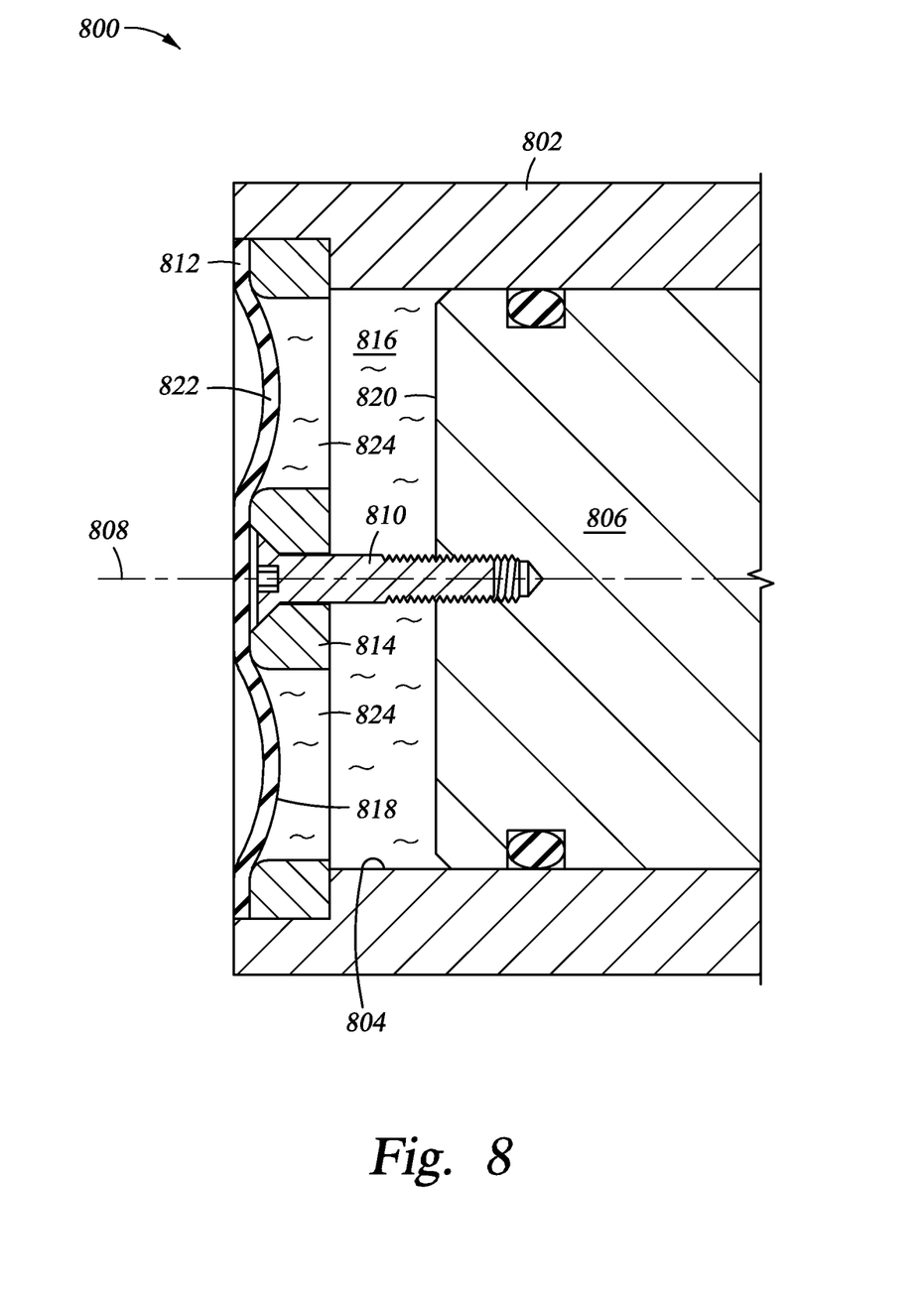
FIG. 8 shows a cross-sectional elevation view of depth trigger mechanism in accordance with at least some embodiments.

In the embodiments of the depth trigger mechanism for the lifting bag system, the discussion has indicated that the pistons are exposed to the pressure of the water such that increasing pressure acts on the piston, eventually fracturing the link and moving from a non-triggered state to a triggered state where the seal on the gas cylinder is punctured. In some cases, the piston is directly exposed to the sea water and pressure, but in other cases the piston may be shielded from the sea water, but nevertheless exposed to the increasing pressure. FIG. 8 shows a cross-sectional view of a portion of a depth trigger mechanism 800 to discuss various embodiments of shielding the piston from the sea water. In particular, the depth trigger mechanism 800 comprises an outer housing 802 that has counter bore 804 within which piston 806 is located. The piston 806 defines a central axis 808 along which the piston moves when the link member 810 is fractured. The depth trigger mechanism 800 further comprises a resilient member 812 coupled over the cover plate 814. More particularly, the resilient member 812 is sealed against the outer housing 802 and/or the cover plate 814 such that the resilient member 812 fluidly isolates the volume 816 from the ambient sea water. The volume 816 defined by the inside surface 818 of the resilient member 812 and outer face 820 of the piston is filled with a non-compressible fluid, such as oil, filtered water, or alcohol. The resilient material may be any suitable material, such as rubber or resilient plastic.

In operation, ambient pressure of the sea water presses against the outer surface 822 of the resilient member 812. Responsive to the pressure, the resilient material presses on the non-compressible fluid within the volume 816, which in turn presses against the outer face 820 of the piston 806. In particular, the resilient member 812 presses on the non-compressible fluid in the volume 816 by way of the apertures 824 in the cover plate 814. The tension force created in the link member 810 by the pressure eventually fractures the link member and causes a change in the operational state from non-triggered to triggered as discussed for the various embodiments above. However, because the piston and link member are not exposed to the sea water, the piston and link member are less likely to experience fouling, such as by barnacles. Moreover, the choice of materials for the piston and link member increases from not-only the copper-based alloys, but also stainless steels and even high density plastics.

References to "one embodiment", "an embodiment", "a particular embodiment", and "some embodiments" indicate that a particular element or characteristic is included in at least one embodiment of the invention. Although the phrases "in one embodiment", "an embodiment", "a particular embodiment", and "some embodiments" may appear in various places, these do not necessarily refer to the same embodiment.

The above discussion is meant to be illustrative of the principles and various embodiments of the present invention. Numerous variations and modifications will become apparent to those skilled in the art once the above disclosure is fully appreciated. For example, a retriever system may comprise just a lifting bag system, or just a ballast weight system. It is intended that the following claims be interpreted to embrace all such variations and modifications.

We claim:

1. A ballast system comprising:
   a ballast attachment block comprising:
      a first end and a second end, each end defining an outside diameter configured to couple to an inside diameter of a geophysical survey cable;
      a first attachment location medially disposed on the ballast attachment block;
      a passage extending between the first end and the second end, the passage disposed within the ballast attachment block;
   a first ballast weight abutting the ballast attachment block at the first attachment location, the first ballast weight defining a first aperture;
   a first depth release mechanism coupling the first ballast weight to the ballast attachment block, the first depth release mechanism comprising
      a piston disposed within a cylinder defined in the ballast attachment block, the piston defining an outer face exposed to ambient pressure;
      a link member coupled to the piston and to the first ballast weight, wherein at depths in water above a predetermined depth the link member holds the piston in a non-triggered state; and
      wherein at the predetermined depth and below ambient pressure acting on the outer face of the piston creates a tension force that breaks the link member and releases the first ballast weight from the first attachment location.

2. The system of claim 1 wherein the link member defines a central axis, the piston defines a central axis, and wherein the central axis of the link member is coaxial with the central axis of the piston.

3. The system of claim 1 wherein the link member is a copper-based alloy.

4. The system of claim 1:
   wherein the link member is brass and has at least one portion defining an outside diameter of about 0.2 centimeter (cm); and
   wherein the piston has an outside diameter of about 2.5 cm.

5. The system of claim 1 wherein the predetermined depth is about 55 meters.

6. The system of claim 1 further comprising:
   a counter bore within the first ballast weight; and
   an extension portion of the piston defined on the distal end of the piston, and in the non-triggered state the extension portion of the piston is telescoped within the counter bore of the first ballast weight;
   wherein at the predetermined depth and below ambient pressure acting of the outer face of the piston retracts the extension portion out of the counter bore of the first ballast weight.

* * * * *